(12) United States Patent  (10) Patent No.: US 9,114,338 B2
Hauville  (45) Date of Patent: Aug. 25, 2015

(54) METHOD AND APPARATUS FOR PURGING UNWANTED SUBSTANCES FROM AIR

(71) Applicant: FIPAK Research and Development Company, Rowley, MA (US)

(72) Inventor: Francois Hauville, Ipswich, MA (US)

(73) Assignee: FIPAK Research and Development Company, Rowley, MA (US)

( * ) Notice: Subject to any disclaimer, the term of this patent is extended or adjusted under 35 U.S.C. 154(b) by 29 days.

(21) Appl. No.: 13/793,145

(22) Filed: Mar. 11, 2013

(65) Prior Publication Data

US 2013/0272935 A1     Oct. 17, 2013

Related U.S. Application Data

(63) Continuation-in-part of application No. 12/998,134, filed as application No. PCT/US2009/057666 on Sep. 21, 2009, which is a continuation-in-part of application No. 12/465,434, filed on May 13, 2009, now Pat. No. 8,152,899.

(60) Provisional application No. 61/098,440, filed on Sep. 19, 2008, provisional application No. 61/244,218, filed on Sep. 21, 2009, provisional application No. 61/608,871, filed on Mar. 9, 2012.

(51) Int. Cl.
  *B01D 53/04* (2006.01)
  *B01D 39/16* (2006.01)
  *B01D 39/20* (2006.01)

(52) U.S. Cl.
  CPC ........ *B01D 39/1623* (2013.01); *B01D 39/1676* (2013.01); *B01D 39/2017* (2013.01); *B01D 53/04* (2013.01); *B01D 2239/065* (2013.01)

(58) Field of Classification Search
  USPC ........... 96/121; 95/90; 55/315, 318, 524, 527, 55/DIG. 13
  See application file for complete search history.

(56) References Cited

U.S. PATENT DOCUMENTS

| | | | |
|---|---|---|---|
| 3,944,403 A | | 3/1976 | Simpson et al. |
| 4,070,300 A | | 1/1978 | Moroni et al. |
| 4,981,501 A | | 1/1991 | Von Blucher et al. |
| 5,288,306 A | | 2/1994 | Aibe et al. |
| 5,372,788 A | * | 12/1994 | Kinoshita et al. ............. 422/122 |
| 5,486,410 A | | 1/1996 | Groeger et al. |
| 5,626,820 A | | 5/1997 | Kinkead et al. |
| 5,662,728 A | | 9/1997 | Groeger |
| 5,772,738 A | * | 6/1998 | Muraoka ......................... 96/129 |
| 6,156,089 A | | 12/2000 | Stemmer et al. |
| 6,302,946 B1 | | 10/2001 | Cronia et al. |
| 6,402,819 B1 | * | 6/2002 | De Ruiter et al. ............... 96/153 |

(Continued)

FOREIGN PATENT DOCUMENTS

| | | |
|---|---|---|
| CN | 2079081 U | 6/1991 |
| CN | 2141873 Y | 9/1993 |

(Continued)

*Primary Examiner* — Frank Lawrence
(74) *Attorney, Agent, or Firm* — Pandiscio & Pandiscio

(57) ABSTRACT

An air filter for purging unwanted substances from air which comprises a filtration media and at least one reactant attached to the filtration media. A method for purging unwanted substances from air which comprises providing an air filter comprising a filtration media and at least one reactant attached to the filtration media, and passing the air which is to be filtered through the air filter so as to purge unwanted substances from the air.

26 Claims, 5 Drawing Sheets

(56) References Cited

U.S. PATENT DOCUMENTS

| | | |
|---|---|---|
| 6,936,094 B2 * | 8/2005 | Minemura et al. ............... 96/154 |
| 7,029,516 B2 * | 4/2006 | Campbell et al. ................. 95/90 |
| 7,132,007 B1 | 11/2006 | Von Blücher et al. |
| 7,285,157 B1 | 10/2007 | Dukes et al. |
| 7,517,381 B2 * | 4/2009 | Rohrbach et al. ............... 55/524 |
| 7,758,836 B1 * | 7/2010 | Huggins et al. ............... 423/220 |
| 8,152,899 B2 | 4/2012 | Hauville |
| 2003/0041733 A1 | 3/2003 | Seguin et al. |
| 2004/0116025 A1 | 6/2004 | Gogins et al. |
| 2006/0042210 A1 * | 3/2006 | Dallas et al. .................... 55/524 |
| 2006/0243134 A1 | 11/2006 | Von Blucher et al. |
| 2008/0010959 A1 | 1/2008 | Gillingham et al. |
| 2008/0110342 A1 | 5/2008 | Ensor et al. |
| 2008/0115670 A1 | 5/2008 | Hauville |
| 2009/0221047 A1 | 9/2009 | Schindler et al. |
| 2011/0259191 A1 | 10/2011 | Hauville |

FOREIGN PATENT DOCUMENTS

| | | |
|---|---|---|
| JP | 9-38449 A | 2/1997 |
| JP | 2000-334244 | 12/2000 |
| WO | WO 2007/146201 | 12/2007 |
| WO | WO 2009/146201 | 12/2009 |

* cited by examiner

METHOD AND APPARATUS FOR PURGING UNWANTED SUBSTANCES FROM AIR

REFERENCE TO PENDING PRIOR PATENT APPLICATION

This patent application:

(i) is a continuation-in-part of pending prior U.S. patent application Ser. No. 12/998,134, filed Jun. 28, 2011 by Francois Hauville for METHOD AND APPARATUS FOR PURGING UNWANTED SUBSTANCES FROM AIR, which patent application in turn claims benefit of International (PCT) Patent Application No. PCT/US2009/057666, filed Sep. 21, 2009 by Francois Hauville for METHOD AND APPARATUS FOR PURGING UNWANTED SUBSTANCES FROM AIR, which patent application in turn claims benefit of (a) prior U.S. Provisional Patent Application Ser. No. 61/098,440, filed Sep. 19, 2008 by Francois Hauville for METHOD AND APPARATUS FOR PURGING UNWANTED SUBSTANCES FROM AIR AND/OR NEUTRALIZING UNWANTED SUBSTANCES IN AIR, (b) prior U.S. Provisional Patent Application Ser. No. 61/244,218, filed Sep. 21, 2009 by Francois Hauville for METHOD AND APPARATUS FOR PURGING UNWANTED SUBSTANCES FROM AIR, and (c) prior U.S. Non-Provisional patent application Ser. No. 12/465,434 now U.S. Pat. No. 8,152,899, filed May 13, 2009 by Francois Hauville for METHOD AND APPARATUS FOR PURGING UNWANTED SUBSTANCES FROM AIR; and (ii) claims benefit of pending prior U.S. Provisional Patent Application Ser. No. 61/608,871, filed Mar. 9, 2012 by Francois Hauville for METHOD AND APPARATUS FOR PURGING AMMONIA AND/OR OTHER TARGET CHEMICALS FROM AIR.

The six (6) above-identified patent applications are hereby incorporated herein by reference.

FIELD OF THE INVENTION

This invention relates to air filters in general, and more particularly to air filters of the sort which purge unwanted substances from air, i.e. to air filters which remove unwanted substances from air and/or neutralize unwanted substances in air.

BACKGROUND OF THE INVENTION

Air filters are used to purge unwanted substances from air. By way of example but not limitation, air filters are commonly used in laboratories to purge unwanted substances from the air in fumehoods before the air is vented from the fumehood, e.g., to the atmosphere or to the ambient air of the laboratory.

In the laboratory application noted above, the air filter typically uses activated carbon granules to purge unwanted substances from the air. Activated carbon is generally preferred for use in air filters because the activated carbon is very effective in purging solvents from air. Furthermore, the use of activated carbon granules is generally highly advantageous, since the activated carbon granules are easily handled, and since they naturally pack into an enclosure with spaces therebetween so as to combine high surface area contact with excellent air flow. Typically, the activated carbon granules are disposed in a simple filter frame, captured between two opposing screens (e.g., meshes, grills, etc.) which pass air therethrough but retain the activated carbon granules therebetween.

While activated carbon granules are extremely effective in purging solvents from the air, they are largely ineffective in purging acids from the air. As a result, where acids may be used within a fumehood, special additives (e.g., rare earth metals, organic metal catalysts, etc.) must be added to the activated carbon granules in order to purge acids from the air. However, these additives tend to reduce the effective surface area of the activated carbon granules, thereby reducing filter capacity. Furthermore, these acid-purging additives are generally only modestly effective in purging acids from the air, and in many cases can comprise relatively toxic materials which may be released in the air by the air flow through the filter.

Thus, incorporating acid-purging additives with the activated carbon granules results in an air filter with reduced efficiency for purging solvents and which has only modest effectiveness for purging acids.

On account of the foregoing, there is a need for a new and improved air filter which is highly effective with respect to both solvents and acids and which works with high efficiency and without using toxic additives.

SUMMARY OF THE INVENTION

These and other objects of the present invention are addressed by the provision and use of a novel air filter which comprises at least two stages, an acid-purging stage and a solvent-purging stage. The acid-purging stage generally comprises an air-permeable skeleton having an acid-neutralizing substance mounted thereto. The solvent-purging stage generally comprises solvent-purging granules packed between two opposing screens (e.g., meshes, grills, etc.).

In one preferred form of the invention, there is provided an air filter for purging unwanted substances from air, the air filter comprising:
an acid-purging stage; and
a solvent-purging stage.

In another form of the invention, there is provided an air filter for purging unwanted substances from air, the air filter comprising:
an acid-purging stage, wherein the acid-purging stage comprises an air-permeable skeleton which has an acid-neutralizing substance mounted thereto, wherein the air-permeable skeleton comprises fiberglass fibers and the acid-neutralizing substance comprises sodium bicarbonate, and further wherein the sodium bicarbonate is secured to the fiberglass fibers using an adhesive; and
a solvent-purging stage, wherein the solvent-purging stage comprises solvent-purging granules captured between two air-permeable screens, and further wherein the solvent-purging granules comprise activated carbon granules.

In another form of the invention, there is provided an air filter for purging unwanted substances from air, the air filter comprising:
an acid-purging stage, wherein the acid-purging stage comprises an air-permeable skeleton which has an acid-neutralizing substance mounted thereto, wherein the air-permeable skeleton comprises open cell polyurethane foam and the acid-neutralizing substance comprises sodium bicarbonate, and further wherein the sodium bicarbonate is secured to the open cell polyurethane foam using an adhesive; and
a solvent-purging stage, wherein the solvent-purging stage comprises solvent-purging granules captured between two air-permeable screens, and further wherein the solvent-purging granules comprise activated carbon granules.

In another form of the invention, there is provided a method for purging unwanted substances from air, the method comprising:
provide an air filter for purging unwanted substances from air, the air filter comprising:
an acid-purging stage; and
a solvent-purging stage; and
passing the air which is to be filtered through the air filter so as to purge unwanted substances from the air.

And in another form of the invention, there is provided a method for purging unwanted substances from air, the method comprising:
providing an air filter for purging unwanted substances from air, the air filter comprising:
an acid-purging stage, wherein the acid-purging stage comprises an air-permeable skeleton which has an acid-neutralizing substance mounted thereto, wherein the air-permeable skeleton comprises fiberglass fibers and the acid-neutralizing substance comprises sodium bicarbonate, and further wherein the sodium bicarbonate is secured to the fiberglass fibers using an adhesive; and
a solvent-purging stage, wherein the solvent-purging stage comprises solvent-purging granules captured between two air-permeable screens, and further wherein the solvent-purging granules comprise activated carbon granules; and
passing the air which is to be filtered through the air filter so as to purge unwanted substances from the air.

And in another form of the invention, there is provided a method for purging unwanted substances from air, the method comprising:
providing an air filter for purging unwanted substances from air, the air filter comprising:
an acid-purging stage, wherein the acid-purging stage comprises an air-permeable skeleton which has an acid-neutralizing substance mounted thereto, wherein the air-permeable skeleton comprises open cell polyurethane foam and the acid-neutralizing substance comprises sodium bicarbonate, and further wherein the sodium bicarbonate is secured to the open cell polyurethane foam using an adhesive; and
a solvent-purging stage, wherein the solvent-purging stage comprises solvent-purging granules captured between two air-permeable screens, and further wherein the solvent-purging granules comprise activated carbon granules; and
passing the air which is to be filtered through the air filter so as to purge unwanted substances from the air.

In another form of the invention, there is provided an air filter for purging unwanted substances from air, the air filter comprising:
a filtration media; and
at least one reactant attached to the filtration media.

In another form of the invention, there is provided a method for purging unwanted substances from air, the method comprising:
providing an air filter comprising:
a filtration media; and
at least one reactant attached to the filtration media; and
passing the air which is to be filtered through the air filter so as to purge unwanted substances from the air.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein.

DETAILED DESCRIPTION OF THE INVENTION

In General

Figure 1:
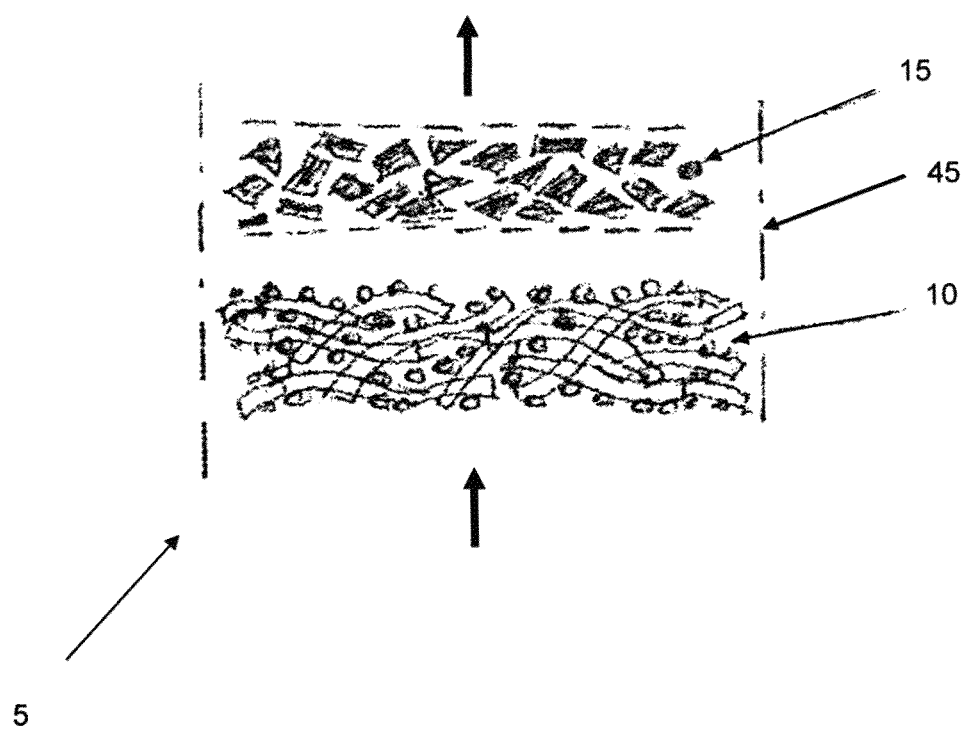
FIG. 1 is a schematic view showing a novel air filter formed in accordance with the present invention.

The present invention provides a new and improved air filter which is effective for purging both solvents and acids from the air with high efficiency. To this end, and looking now at FIGS. 1 and 1A, there is shown a novel air filter 5 formed in accordance with the present invention. Air filter 5 generally comprises two stages, an acid-purging stage 10 followed by a solvent-purging stage 15.

Acid-purging stage 10 generally comprises an air-permeable skeleton 20 having an acid-neutralizing substance 25 mounted thereto. In one preferred form of the invention, and looking now at FIG. 1, acid-purging stage 10 comprises fibers (e.g., fiberglass fibers) which have sodium bicarbonate adhered thereto. In another preferred form of the invention, and looking now at FIG. 1A, acid-purging stage 10 comprises an open cell foam (e.g., open cell polyurethane foam) with sodium bicarbonate adhered thereto.

Solvent-purging stage 15 generally comprises solvent-purging granules 30 packed between two opposing, air-permeable screens (e.g., meshes, grills, etc.) 35. In one preferred form of the invention, the solvent-purging granules comprise activated carbon granules.

As a result of this construction, when air is passed through air filter 5, the air first passes through acid-purging stage 10, where acid-neutralizing substance 25 (e.g., sodium bicarbonate) effectively neutralizes any acids which may be present in the air. Thereafter, the air passes through solvent-purging stage 15, where solvent-purging granules 30 (e.g., activated carbon granules) purge any solvents which may be present in the air.

Acid-Purging Stage 10

Looking next at FIGS. 1, 1A and 2-4, acid-purging stage 10 generally comprises an air-permeable skeleton 20 having an acid-neutralizing substance 25 mounted thereto.

In one preferred form of the invention, and looking now at FIG. 1, acid-purging stage 10 comprises fiberglass fibers which have sodium bicarbonate adhered thereto. Sodium bicarbonate is extremely effective in neutralizing acids, and is relatively inexpensive, but its powder-like consistency makes it difficult to use in an air filter, where high surface area contact is required. The present invention solves this difficulty, and makes it practical to use sodium bicarbonate in an air filter, by providing a new and improved method for supporting the sodium bicarbonate in an acid-purging stage.

Figure 2:
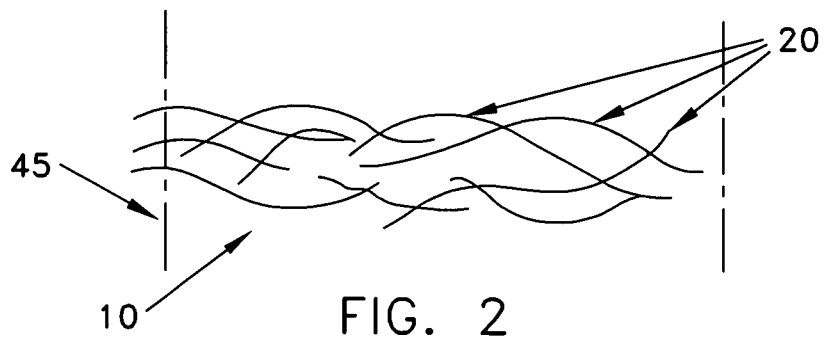
FIGS. 2-4 are schematic views showing how the acid-purging stage of the novel air filter can be fabricated.
Figure 3:
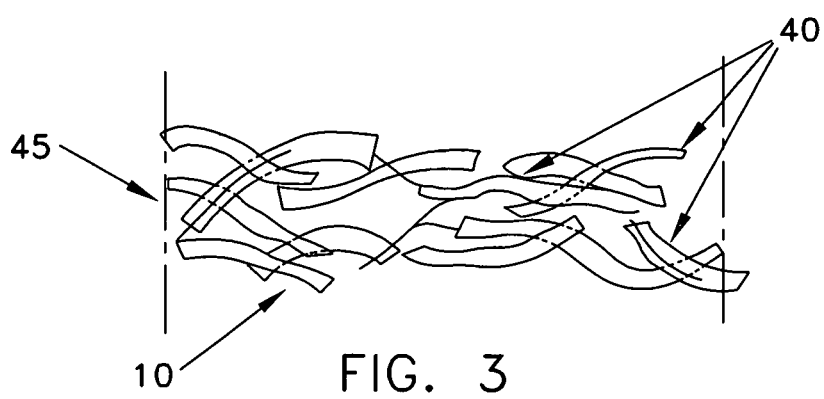
Figure 4:
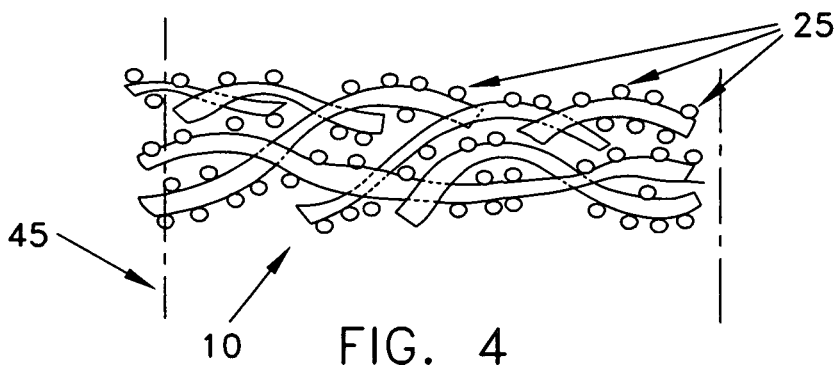

More particularly, and looking now at FIG. 2, acid-purging stage 10 preferably comprises an air-permeable mass of fiberglass fibers which together create the air-permeable skeleton 20. These fiberglass fibers are highly resistant to acids and bases, and easily pass air therethrough with nominal pressure loss. Looking next at FIG. 3, the fiberglass fibers are coated with an adhesive 40. Then, and looking now at FIG. 4, sodium bicarbonate powder is deposited on the fiberglass fibers, with adhesive 40 binding the sodium bicarbonate powder to the fiberglass fibers.

Thus it will be seen that the sodium bicarbonate is interspersed throughout, and adheres to, air-permeable skeleton 20, so that air passing therethrough makes excellent surface area contact with the sodium bicarbonate, whereupon the sodium bicarbonate can neutralize acids in the air.

If desired, acid-purging stage 10 can comprise an air-permeable skeleton 20 made with a structure and/or a material other than, or in addition to, fiberglass fibers (e.g., polyurethane fibers, an open cell foam, etc.), and/or acid-purging stage 20 can comprise an acid-neutralizing substance 25 other than, or in addition to, sodium bicarbonate (e.g., sodium hydroxide, potassium hydroxide, sodium carbonate, calcium carbonate, calcium bicarbonate, calcium hydroxide, etc.).

Figure 1A:
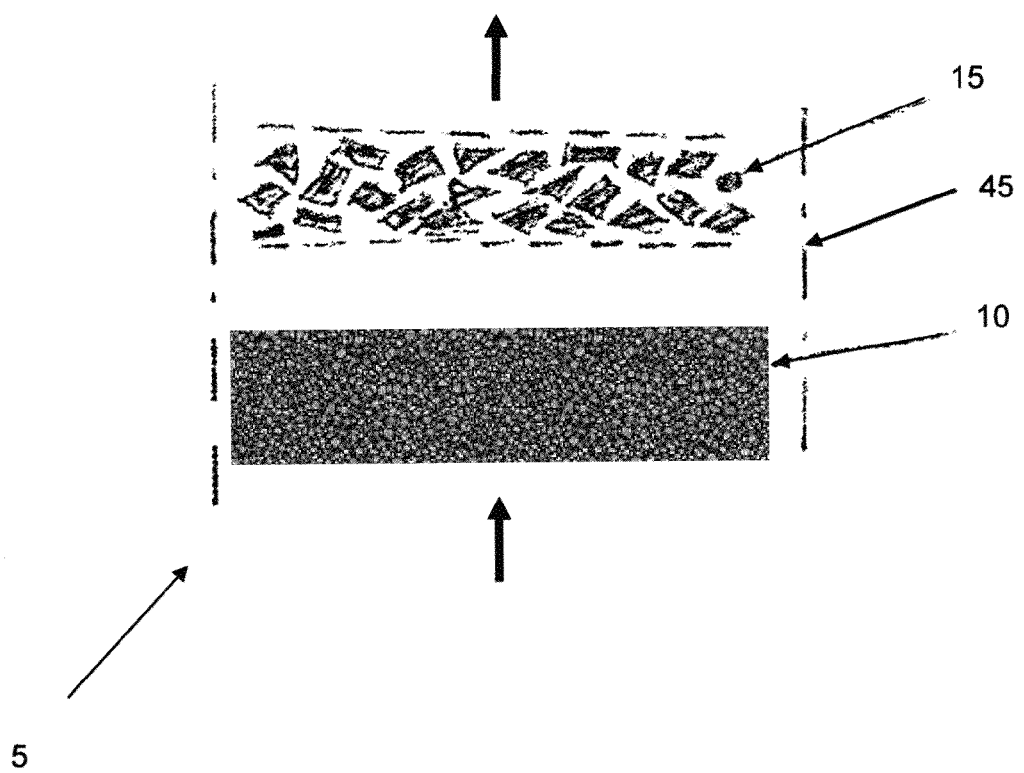
FIG. 1A is a schematic view showing another novel air filter formed in accordance with the present invention.

Thus, in another preferred form of the invention, and looking now at FIG. 1A, acid-purging stage 10 comprises an open cell foam with an acid-neutralizing substance adhered thereto. By way of example but not limitation, acid-purging stage 10 preferably comprises open cell polyurethane foam (preferably having a pore characteristic of 20 PPI, i.e., 20 pores per inch), having sodium bicarbonate adhered thereto. This open cell polyurethane foam is highly resistant to acids and bases, and easily passes air therethrough with nominal pressure loss.

Solvent-Purging Stage 15

Figure 5:
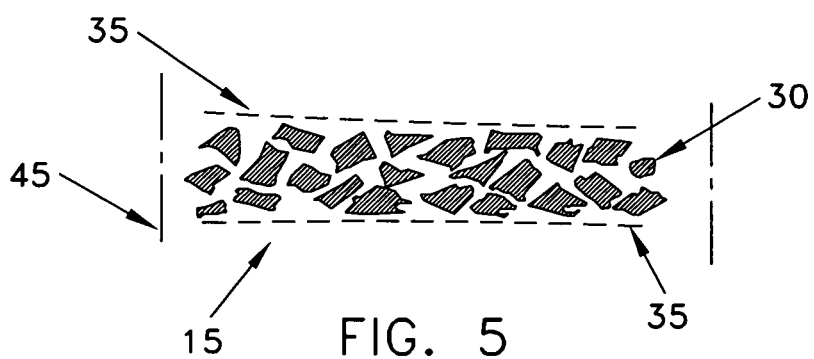
FIG. 5 is a schematic view showing further details of the solvent-purging stage of the novel air filter.

Looking now at FIG. 5, solvent-purging stage 15 generally comprises solvent-purging granules 30 packed between two opposing screens (e.g., meshes, grills, etc.) 35. In one preferred form of the invention, the solvent-purging granules comprise activated carbon granules captured between two opposing screens (e.g., meshes, grills, etc.) which pass air therethrough but retain the activated carbon granules therebetween.

Two-Stage Construction

Returning now to FIG. 1, it will be seen that novel air filter 5 comprises a filter frame 45 having mounted therein two filter stages, the acid-purging stage 10 followed by the solvent-purging stage 15. Acid-purging stage 10 comprises the air-permeable skeleton 20 (preferably fiberglass fibers or an open cell polyurethane foam) which has the acid-neutralizing substance 25 (preferably sodium bicarbonate) mounted thereto. Solvent-purging stage 15 comprises the solvent-purging granules 30 (preferably activated carbon granules). As a result of this construction, when air is passed through air filter 5, the air first passes through acid-purging stage 10, where acid-neutralizing substance 25 (e.g., sodium bicarbonate) neutralizes acids which may be present in the air. Thereafter, the air passes through solvent-purging stage 15, where solvent-purging granules 30 (e.g., activated carbon granules) purge solvents which may be present in the air. Thus, the novel air filter of the present invention is capable of purging both acids and solvents from the air passing through the filter.

Significantly, the foregoing construction provides substantial advantages over the prior art, since it separates the acid-purging operation from the solvent-purging operation, embodying each operation in a separate stage of a singular filter frame, thereby allowing each operation to be optimized for its own particular purpose without detracting from the other operation.

More particularly, the acid-purging stage of the present invention is optimized by, preferably, using highly effective and relatively inexpensive sodium bicarbonate, supported on an air-permeable skeleton structure (e.g., fiberglass fibers, an open cell polyurethane foam, etc.), to neutralize acid. In this respect it should be appreciated that sodium bicarbonate is significantly more effective in neutralizing acids from air than the rare earth metals and organic metal catalysts traditionally used in air filters to purge acids from the air. Significantly, the use of sodium bicarbonate in the air filter also eliminates the toxicity concerns which can be present when using the rare earth metals and organic metal catalysts of the prior art.

Furthermore, the solvent-purging stage of the present invention is optimized by, preferably, using highly effective activated carbon granules to purge solvents from air, but without the addition of the aforementioned acid-purging rare earth metals and organic metal catalysts which can reduce the solvent-purging capacity thereof.

Reversing the Order of the Stages

In the preceding discussion, acid-purging stage 10 precedes solvent-purging stage 15 in the air flow, i.e., air moving through the air filter moves through acid-purging stage 10 before it moves through solvent-purging stage 15. However, it will be appreciated that, if desired, the acid-neutralizing stage can follow the solvent-purging stage, i.e., air moving through the air filter can move through the solvent-purging stage before it moves through the acid-purging stage.

Further Aspects of the Invention

Thus it will be seen that the present invention is unique in a number of ways, including (i) the two-stage composite construction of the air filter, which combines an acid-purging stage with a solvent-purging stage, (ii) the use of sodium bicarbonate in an air filter, and (iii) the manner in which the sodium bicarbonate is supported within the air filter (e.g., on an air permeable skeleton such as fiberglass fibers, open cell polyurethane foam, etc.).

Furthermore, the present invention purges acids from the air without requiring the use of toxic additives.

And the present invention purges unwanted acids from the air without diminishing the capacity of the air filter to purge solvents from the air.

Also, the present invention utilizes an inexpensive acid-neutralizing substance to purge acids from the air.

Additionally, the present invention provides for the binding of powders to fibers and/or open cell foam which can be industrialized in an inexpensive manner.

And the present invention provides a novel air filter which is particularly advantageous for filtering the air in fume hoods.

Still other advantages of the present invention will be apparent to those skilled in the art in view of the present invention.

Purging Ammonia and/or Other Target Chemicals from Air

Ammonia is one of the most troublesome chemicals present in a laboratory. Among other things, ammonia is highly volatile, has a very low olfactory limit, and is highly detrimental to human health. At the same time, ammonia is also one of the 12 most common chemicals found in a laboratory. For this reason, it is important that there be effective methods and apparatus for protecting laboratory personnel (e.g., chemists, etc.) from the harmful effects of ammonia.

As noted above, because of the harmful properties of ammonia, it is important to protect laboratory personnel from respiratory exposure to ammonia. To this end, filtration fumehoods are commonly used by laboratory personnel to protect themselves from ammonia. In a filtration fumehood (also known as a recirculatory fumehood and/or as a filtering fumehood), impregnated activated carbon filters (designed for this specific use) are commonly used to trap ammonia vapors. More particularly, these activated carbon filters are impregnated with a chemical specifically chosen for its reaction with ammonia (e.g., sulfuric acid, $ZnCl_2$, etc.). It is necessary to impregnate the activated carbon filters with a reactant because "classical" (i.e., non-impregnated) activated carbon filters do not efficiently remove ammonia from air. Hence, it is necessary to impregnate the activated carbon filters with a reactant so as to attract and neutralize the ammonia vapors.

One aspect of this prior art technology of impregnated activated carbon filters is that the combined properties of the activated carbon, and the chemical reactant impregnated in the activated carbon, allow the neutralization of a small concentration of ammonia per quantity of impregnated activated carbon, with a high efficiency (i.e., greater than 99%, if the filter is correctly designed). However, one of the limits of this prior art technology of impregnated activated carbon filters is that the chemical (i.e., the reactant) used for the impregnation loads the porous network of the activated carbon, making it impractical to add other neutralizing and/or purging substances to the impregnated activated carbon filter. As a result, where the reactant is selected to neutralize ammonia, the impregnated activated carbon filter is effectively limited to neutralizing ammonia (and highly related chemicals).

This same problem tends to occur for impregnated activated carbon filters which employ other reactants for purging chemicals other than ammonia from the air.

Thus it will be seen that with impregnated activated carbon filters, each filter is effectively limited to handling a short list of chemicals. As a result, the users of filtration fumehoods must select a particular impregnated activated carbon filter for their fumehood in accordance with the chemicals that they will be handling in the fumehood, e.g., an activated carbon filter impregnated with sulfuric acid for use when handling ammonia, an activated carbon filter impregnated with potassium carbonate for use when handling inorganic acids, etc. This can be problematic, since it may require a filter change when different materials are to be handled in the fumehood Furthermore, in some cases, there is no appropriate filter for neutralizing the complete array of chemicals that the user will be handling in the fumehood at a particular time. By way of example but not limitation, a chemist who needs to handle acids, bases and solvents cannot currently easily find a single fumehood filter which can simultaneously protect against these chemicals.

Thus there is a need for a new and improved filter which can effectively handle a broad range of chemicals which need to be safely handled by laboratory personnel.

The present invention comprises the provision and use of a new filtration media for chemical neutralization (and preferably for ammonia vapor neutralization), wherein the new filtration media comprises an open cell foam, a reactant (e.g., citric acid for neutralizing ammonia) disposed on the surface of the open cell foam, and glue for holding the reactant (e.g., citric acid) on the surface of the open cell foam.

The open cell foam is preferably formed out of polyurethane (PU), polyethylene (PE), silicone, rubber, polyvinylchloride (PVC) or other material which is resistant to the effects of the target chemical which is to be purged (e.g., ammonia). The open cell foam has a pore size which (a) allows the open cell foam to present a large surface area, and (b) is capable of easily passing air therethrough without imposing a significant pressure drop on the flow of air through the filter, e.g., the open cell foam may have a pore size of 20 pores per inch (PPI).

The reactant is impregnated on the surfaces of the open cell foam so that the reactant is presented to air passing through the open cell foam, whereby to allow the reactant to efficiently react with the target chemical in the air and thereby neutralize the target chemical by virtue of the chemical reaction of the reactant with the target chemical.

In one preferred form of the present invention, the target chemical is ammonia, and the reactant is citric acid.

In one particularly preferred form of the present invention, the citric acid is in granular form, and the citric acid crystals (small grain) are sprinkled directly on the surface of the open cell foam, without requiring that the citric acid be placed in a liquid solution for deployment on the open cell foam (direct sprinkling of citric acid crystals consumes less energy (because it does not require drying), and allows the deposition of a greater quantity of citric acid on the open cell foam). In one preferred form of the present invention, the citric acid crystals have an average grain size majority comprised between 25 ASTM Mesh and 50 ASTM Mesh.

Glue is used to maintain the reactant (e.g., the citric acid crystals) on the surface of the open cell foam. The glue is selected so that the glue does not interact with the open cell foam, and/or with the reactant (e.g., the citric acid), and/or with the target chemical (e.g., ammonia) which is to be filtered from the air. In one preferred form of the present invention, the glue comprises polyvinyl acetate or ethylene vinyl acetate copolymers or acrylic copolymers or other emulsions.

During manufacture, the glue is applied (e.g., by brushing, spraying, etc.) to the open cell foam first, and then the reactant (e.g., citric acid crystals) is applied (e.g., by sprinkling, blowing, etc.) on the surface of the glue-bearing open cell foam.

Figure 6:
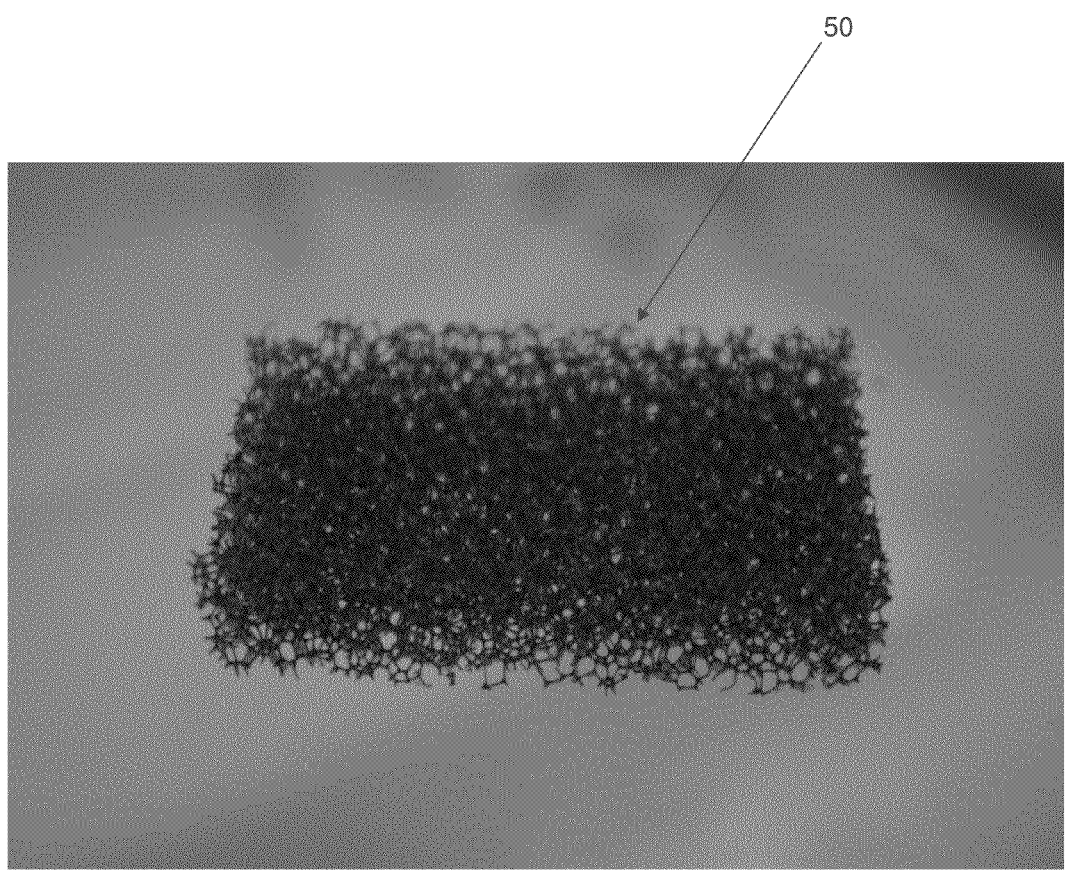
FIG. 6 is a photograph showing a piece of open cell polyurethane (PU) foam before impregnation with citric acid crystals.
Figure 7:
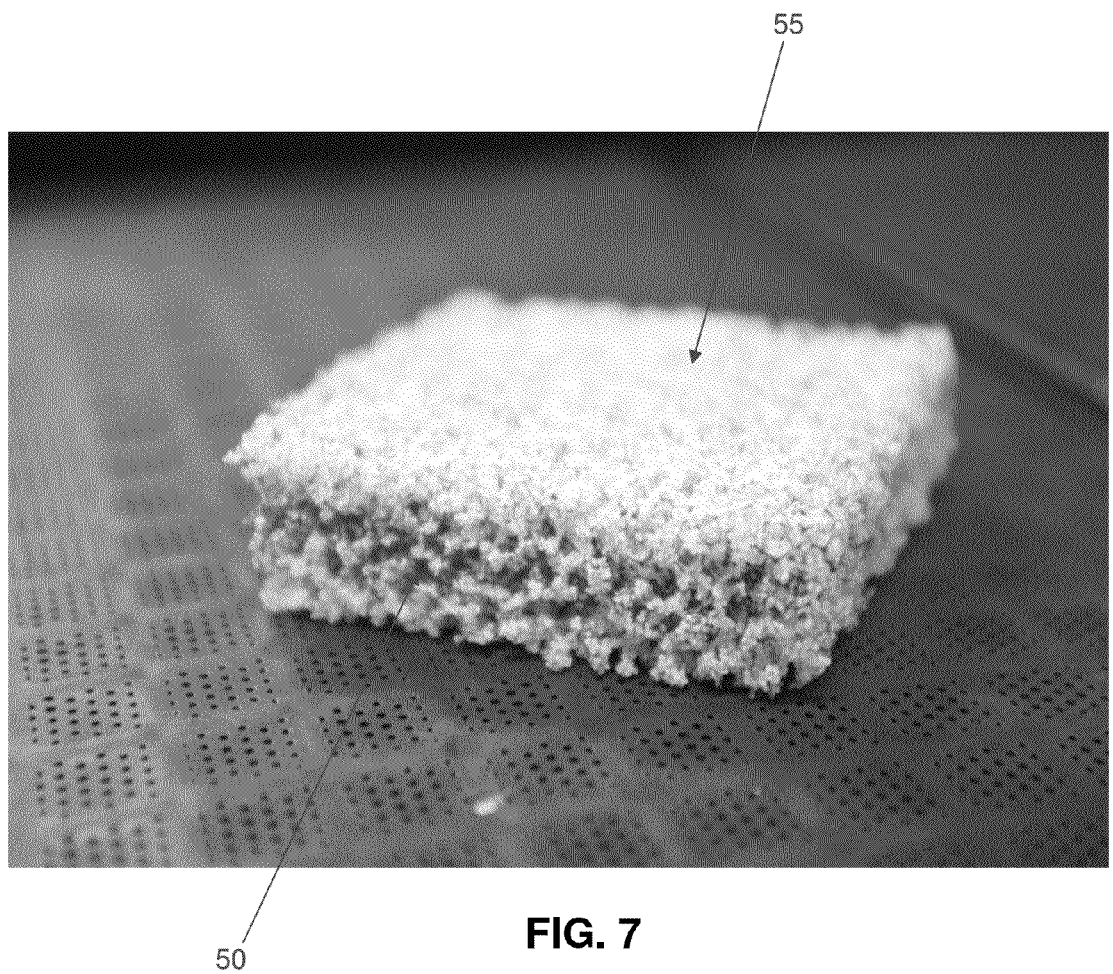
FIG. 7 is a photograph of a piece of open cell polyurethane (PU) foam after the open cell polyurethane (PU) foam has been impregnated with granular citric acid crystals.

See FIG. 6, which is a photograph showing a piece of open cell polyurethane (PU) foam 50 before impregnation with citric acid crystals; and FIG. 7, which is a photograph of a piece of open cell polyurethane (PU) foam 50 after granular citric acid 55 has been deposited on its surfaces.

During use, the target chemical (e.g., ammonia) is neutralized on the surface of the open cell foam after a reaction with the reactant (e.g., the citric acid) carried by the open cell foam. In the case of ammonia vapors and citric acid, it is a classical acid-base reaction which leads to the creation of an ammonium citrate salt. This ammonium citrate salt is solid and is retained on the surface of the open cell foam by virtue of the glue which binds the citric acid crystals to the surface of the open cell foam.

It is also possible to form the new filter using a reactant other than citric acid, for purging ammonia vapors and/or other target chemicals from air. By way of example but not limitation, the following alternative acids can be used in place of the aforementioned citric acid: oxalic acid, tartaric acid, maleic acid, ascorbic acid, succinic acid, anhydrous phosphoric acid, etc. In this respect it should be appreciated that the reactant (i.e., citric acid or an alternative acid) may be a strong acid or a weak acid. Furthermore, it should also be appreciated that, in addition to its acidic property, the reactant carried by the open cell foam is solid at normal temperature and pressure.

Significantly, and unlike the prior art filters utilizing activated carbon, the open cell foam of the present invention can carry multiple reactants for purging multiple target chemicals from the air. Thus, with the present invention, it is not necessary for the filter to be restricted to use for just one target chemical.

Use of the Novel Ammonia/other Target Chemical Purging Filter in Conjunction with other Filter Stages It should be appreciated that the novel ammonia/other target chemical purging filter of the present invention can be used alone (e.g., for purging ammonia and/or other target chemicals), or it can be used in combination with other filtration media to further enlarge the range of target chemicals which can be purged from air.

By way of example but not limitation, the novel ammonia/other target chemical purging filter of the present invention can be used as one stage of a multi-stage filter, wherein another stage of the multi-stage filter may comprise an activated carbon filter (which may or may not be impregnated with a reactant).

By way of further example but not limitation, the novel ammonia/other target chemical purging filter of the present invention may form one stage of a three-stage filter, i.e., the three-stage filter may comprise an acid-purging stage (e.g., comprising an open cell foam carrying sodium bicarbonate), a solvent-purging stage comprising activated carbon granules, and an ammonia-purging stage comprising an open cell foam carrying citric acid (or an alternative reactant). In this form of the invention, the ammonia-purging stage is preferably placed before the solvent-purging stage, and may be placed before the acid-purging stage if desired.

Modifications

It is to be understood that the present invention is by no means limited to the particular constructions herein disclosed and/or shown in the drawings, but also comprises any modifications or equivalents within the scope of the invention.

What is claimed is:

1. An air filter for purging unwanted substances from air, the air filter comprising:
    a filtration media; and
    at least one reactant attached to the filtration media;
    wherein the filtration media comprises an air-permeable structure;
    wherein the air-permeable structure comprises an open cell foam; and
    wherein the at least one reactant comprises at least one from the group consisting of citric acid, oxalic acid, tartaric acid, maleic acid, ascorbic acid, succinic acid, and anhydrous phosphoric acid.

2. An air filter according to claim 1 wherein the open cell foam comprises open cell polyurethane foam.

3. An air filter according to claim 2 wherein the open cell polyurethane foam has a pore characteristic of 20 PPI.

4. An air filter according to claim 1 wherein the air-permeable structure comprises an open cell foam formed out of at least one from the group consisting of polyurethane, polyethylene, silicone, rubber, polyvinylchloride, and other materials which are resistant to the effects of a substance being passed through the filter.

5. An air filter according to claim 1 wherein the at least one reactant comprises citric acid.

6. An air filter according to claim 5 wherein the citric acid comprises citric acid crystals.

7. An air filter according to claim 6 wherein the citric acid crystals have an average grain size majority of between 25 ASTM Mesh and 50 ASTM Mesh.

8. An air filter according to claim 1 wherein the at least one reactant is attached to the filtration media with a glue.

9. An air filter according to claim 8 wherein the glue is selected from the group consisting of polyvinyl acetate, ethylene vinyl acetate copolymers, acrylic copolymers and other emulsions.

10. An air filter according to claim 1 comprising a plurality of reactants attached to the filtration media.

11. An air filter according to claim 1 further comprising an acid-purging stage.

12. An air filter according to claim 1 further comprising a solvent-purging stage.

13. An air filter according to claim 1 further comprising an acid-purging stage and a solvent-purging stage.

14. A method for purging unwanted substances from air, the method comprising:
    providing an air filter comprising:
        a filtration media; and
        at least one reactant attached to the filtration media;
        wherein the filtration media comprises an air-permeable structure;
        wherein the air-permeable structure comprises an open cell foam; and
        wherein the at least one reactant comprises at least one from the group consisting of citric acid, oxalic acid, tartaric acid, maleic acid, ascorbic acid, succinic acid, and anhydrous phosphoric acid; and
    passing the air which is to be filtered through the air filter so as to purge unwanted substances from the air.

15. A method according to claim 14 wherein the open cell foam comprises open cell polyurethane foam.

16. A method according to claim 15 wherein the open cell polyurethane foam has a pore characteristic of 20 PPI.

17. A method according to claim 14 wherein the air-permeable structure comprises an open cell foam formed out of at least one from the group consisting of polyurethane, polyethylene, silicone, rubber, polyvinylchloride, and other materials which are resistant to the effects of a substance being passed through the filter.

18. A method according to claim 14 wherein the at least one reactant comprises citric acid.

19. A method according to claim 18 wherein the citric acid comprises citric acid crystals.

20. A method according to claim 19 wherein the citric acid crystals have an average grain size majority of between 25 ASTM Mesh and 50 ASTM Mesh.

21. A method according to claim 14 wherein the at least one reactant is attached to the filtration media with a glue.

22. A method according to claim 21 wherein the glue is selected from the group consisting of polyvinyl acetate, ethylene vinyl acetate copolymers, acrylic copolymers and other emulsions.

23. A method according to claim 14 comprising a plurality of reactants attached to the filtration media.

24. A method according to claim 14 further comprising an acid-purging stage.

25. A method according to claim 14 further comprising a solvent-purging stage.

26. A method according to claim 14 further comprising an acid-purging stage and a solvent-purging stage.

\* \* \* \* \*